United States Patent [19]

Savoka

[11] Patent Number: 4,906,131
[45] Date of Patent: Mar. 6, 1990

[54] METHOD FOR INSTALLING SPRINKLER HEADS

[76] Inventor: George Savoka, 38 E. First St., Clifton, N.J. 07011

[21] Appl. No.: 371,248

[22] Filed: Jun. 26, 1989

[51] Int. Cl.⁴ .............................................. E02B 11/00
[52] U.S. Cl. ...................................... 405/36; 405/174; 239/1; 239/201
[58] Field of Search ........................ 405/36, 40, 41, 42, 405/174, 184; 239/201, 202, 203, 204, 205, 206, 1

[56] References Cited

U.S. PATENT DOCUMENTS

| | | | |
|---|---|---|---|
| 2,909,134 | 10/1959 | Knietel | 405/41 X |
| 4,497,333 | 2/1985 | Rodiek | 405/41 X |
| 4,497,440 | 2/1985 | Galloway | 239/201 |

Primary Examiner—Dennis L. Taylor
Assistant Examiner—Arlen L. Olsen
Attorney, Agent, or Firm—M. K. Silverman

[57] ABSTRACT

A method for attaching a sprinkler head to the free end of a length of pipe which has been laid within a trench. The method includes the step of excavating about the immediate region beyond projection of the free end of the pipe from the ground. This step is followed by the step of cutting the free end of the pipe which projects above ground level, such that a resulting new end of the pipe terminates several inches below ground level. Then a conduit is connected at a first end to the newly created end of the entrenched pipe and an opposite end of the conduit is positioned below first end within the trench at about the same depth as the rest of the pipe. At the opposite end of the conduit the sprinkler or related device is then attached.

2 Claims, 3 Drawing Sheets

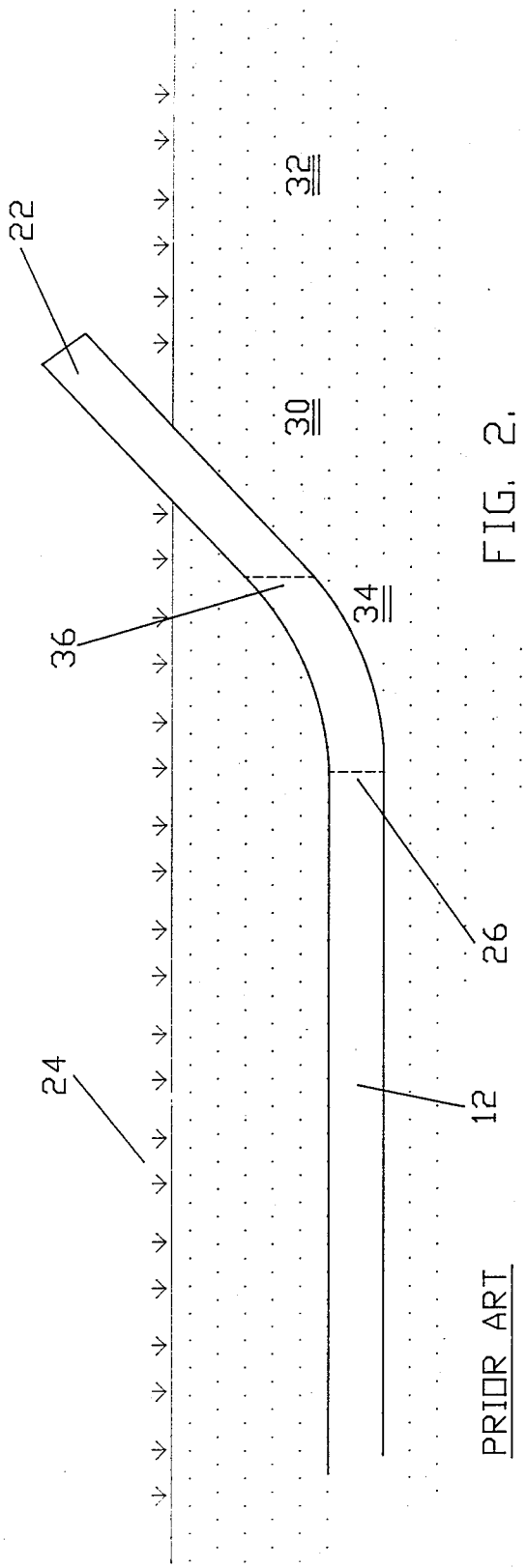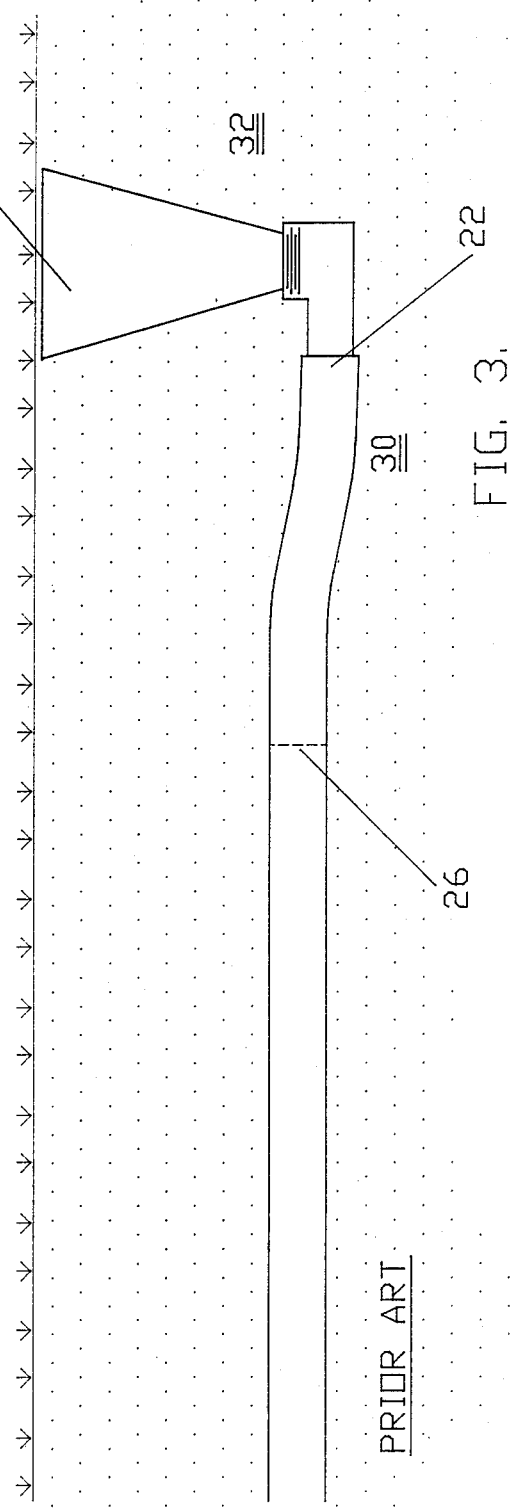

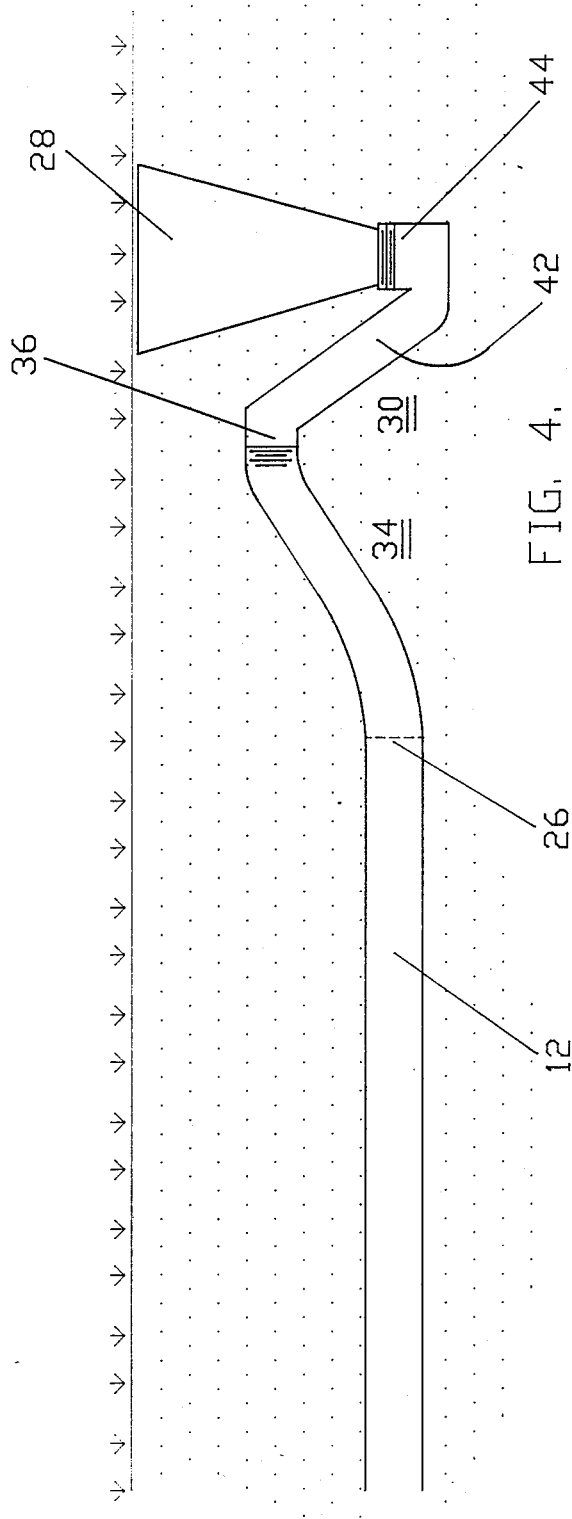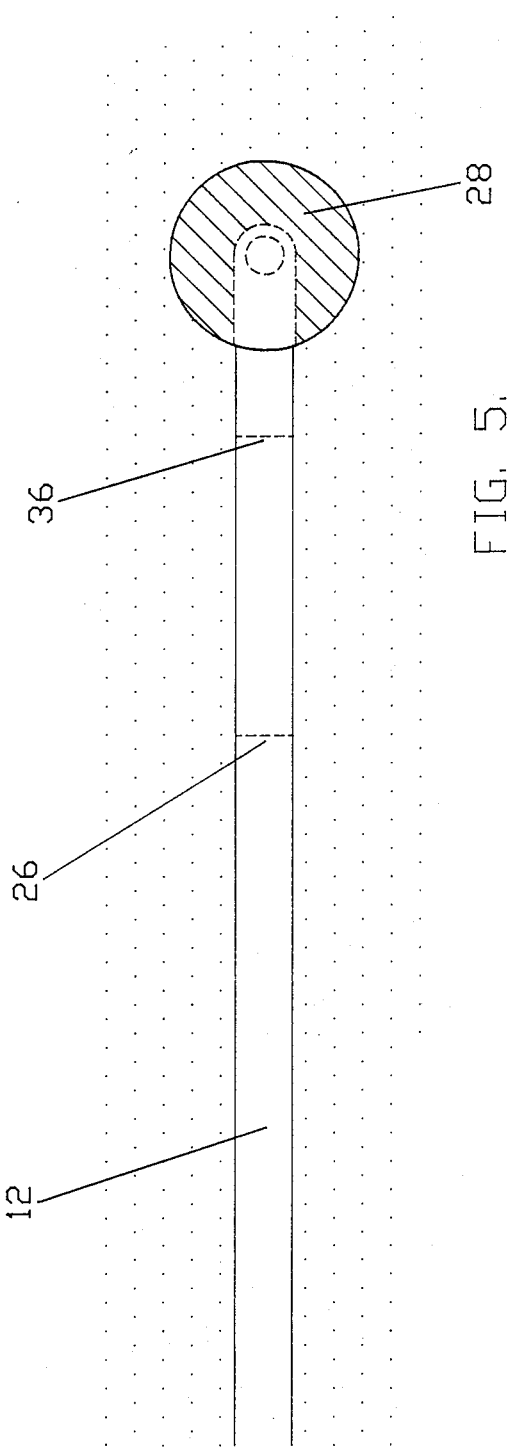

METHOD FOR INSTALLING SPRINKLER HEADS

BACKGROUND OF THE INVENTION

With the use of modern excavation equipment, such as trenchers, a flexible pipe, such as a polyurethane pipe is implanted at the bottom of the trench formed by such equipment. When the operation of trenching and pipe laying is completed, one is generally left with an end of the pipe which projects diagonally outward from the bottom of the trench and through the ground surface.

Where one wishes, as is typically the case, to affix a sprinkler head, or other fluid dynamic device, at the free end of the entrenched pipe, it is necessary to manually excavate a region surrounding the projecting end of the pipe, extending back approximately two feet from the end of the pipe. This is also necessary to remove the soil underneath the diagonally projecting end of the pipe so that end of the pipe may be pressed downward into the ditch and into linear alignment with the rest of the pipe.

After such manual excavation is completed, the sprinkler, or other fluid dynamic device can then be manually coupled to th end of the pipe.

The above approach to post-trenching excavation is not desirable in that much of the savings in time and labor associated with the use of the trenching equipment is lost when the sprinkler head must be attached at the end of the embedded pipe.

The instant invention addresses the above problem by providing a method which substantially reduces the amount of manual excavation which is necessary, after a trenching operation, to affix the sprinkler head to the free end of the entrenched pipe.

To the best knowledge of the inventor, there does not exist any prior art relevant to the instant inventive method.

SUMMARY OF THE INVENTION

The present invention relates to a method for attaching a sprinkler head to the free end of a length pipe which has been laid within a trench. The method more particularly comprises the step of excavating about the immediate regon beyond the projection of the free end of the pipe from the ground. This step is followed by the step of cutting the free end of said pipe which projects above ground level such that a resulting new end of said pipe terminates several inches below ground level. Thereafter, a conduit is connected at a first end, to said newly created end of the entrenched pipe and an opposite end of said conduit is positioned below said first end and within the trench at about the same depth as the rest of the pipe. At said opposite end of the conduit the sprinkler or related device is then attached.

It is accordingly an object of the present invention to reduce the amount of manual excavation required after trenching equipment has been used to bury a length of pipe and it is desired to attach a sprinkler or the like at the free end of the entrenched pipe.

It is another object of the invention to provide a more convenient means of attaching a sprinkler at the free end of an entrenched pipe.

The above and yet other objects and advantages of the present invention will become apparent in the hereinafter set forth Brief Description of the Drawings, Detailed Description of the Invention, and Claims appended herewith.

BRIEF DESCRIPTION OF THE DRAWINGS

FIG. 2 is a vertical schematic view showing the position of an entrenched pipe after it has been detached, in prior art fashion, from trenching equipment.

FIG. 3 is a schematic view, similar to FIG. 2, however, showing the entrenched pipe after the area surrounding the free end of said pipe has been excavated and a sprinkler head coupled to the end thereof.

FIG. 4 is a vertical schematic view showing the entrenched pipe after excavation in the area thereof according to the inventive method.

FIG. 5 is a top schematic view of FIG. 4.

DETAILED DESCRIPTION OF THE INVENTION

Figure 1:
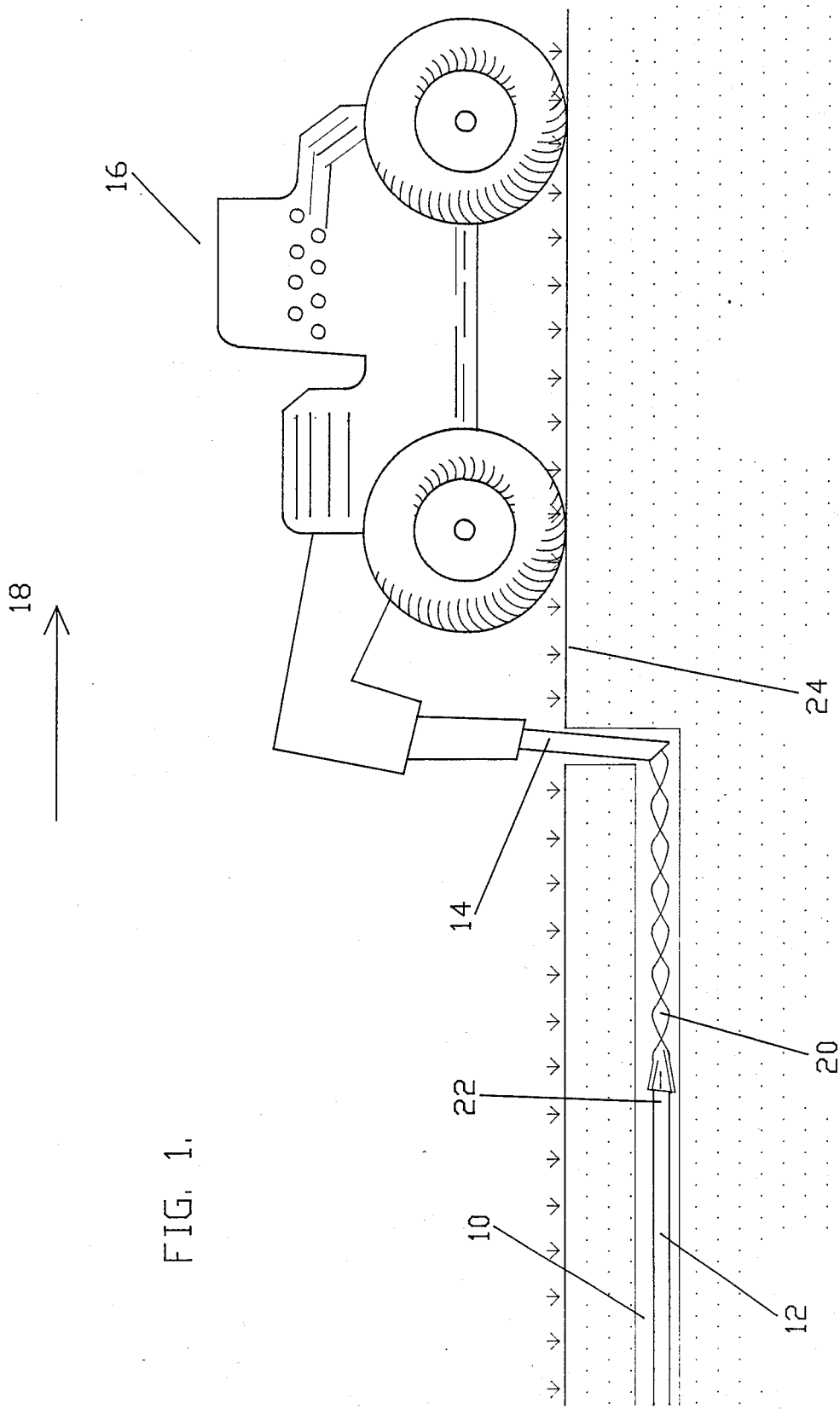
FIG. 1 is a schematic view showing the manner in which a pipe is positioned within a trench by the excavation equipment.

With reference to FIG. 1, there is shown an environmental view illustrating more specifically the manner in which power excavation equipment 16 such as a trencher, ditch digger, irrigation plough or the like, is used to cut a vertical longitudinal trench 10 and to lay at the bottom of such trench a flexible pipe 12 which is typically formed of a polyurethane or similarly flexible material. With this process, a blade 14 of the power equipment 16 cuts a vertical channel within which pipe 12 is slipped. As equipment 16 advances in direction 18, pipe 12 is pulled in direction 18 by chain 20 which is attached to blade 14. At the end of the entrenchment process shown in FIG. 1, chain 20 will pull free end 22 of pipe 12 out, above ground level 24, to effect the result FIG. 2. In FIG. 2, the typical depth of pipe 12 beneath surface 24 is in the range of six to eight inches.

Further, as may be noted in FIG. 3, the horizontal distance from the beginning, at point 26, of the bend of pipe 12 to the free end 22 thereof is between 18 and 24 inches. Accordingly, to affix a sprinkler 28 at the end 22 of pipe 12 it is necessary to first excavate the regions 30 and 34 which are underneath pipe 12, between point 26 and end 22 thereof. Also, in order to provide sufficient space for sprinkler 28 it is necessary to excavate an additional region 32 to the right of area 30.

After regions 30 and 34 have been excavated, one may, as is shown in FIG. 3, bend pipe end 22 downward and, thereafter, place sprinkler 28 within region 32 to connect the sprinkler to pipe end 22. Accordingly, it may be appreciated that in order to, in the prior art, install a sprinkler at the end of an entrenched pipe it is necessary to excavate regions 30, 32, and 34 before sprinkler 28 is installed. This is a time and energy consuming step which, in large part, undermines the benefits achieved in the use of equipment 16.

With respect to FIGS. 2 and 4, it may be noted that, in the present method, pipe 12 is cut below ground level 24 at point 36. Therein, the soil in regions 32 and 34 remains undistrubed and it is only necessary to excavate in region 30 to provide sufficient space for the attachment of a conduit 42 at point 36 of pipe 12. See FIG. 4. As may be noted, conduit 42 slopes downward from point 36 to end 44 which reaches the depth of pipe 12.

After the conduit 42 has been attached at point 36 to pipe 12, sprinkler 28 may be attached at end 44 of the conduit 12.

From FIGS. 4 and 5 it may readily be appreciated that the amount of manual excavation in the region 30 new end of pipe 12 is substantially reduced versus the method of the prior art shown in FIGS. 2 and 3. More particularly, the amount of manual excavation is only about one third of that required in the prior art method.

It is to be appreciated that pipe elements having configuration other than that of conduit 42 and of sprinkler head 28, may be used within the scope of the instant invention.

Accordingly, while there has been shown and described the preferred embodiment of the present invention, it is to be appreciated that the invention may be embodied otherwise that is herein speicifically shown and described, and that within said embodiment, certain changes may be made in the details thereof without departing from the underlying principles of this invention within the scope of the claims appended herewith.

Having thus described my invention, what I claim as new, useful and non-obvious and, accordingly secure by Letters Patent of the United States is:

1. A method for reducing the degree of manual excavations associated with the placement of a sprinkler on a free end of an entrenched pipe, the method comprising the steps of:

(a) cutting the free end of the pipie at a point between the ground level and the depth of the entrenched pipe whereby the remaining free end of said entrenched pipe extends upwardly;

(b) excavating in the area immediately to that side of said cut end of said entrenched pipe opposite to the entrenched side of said pipe end, and said excavation being to a depth about equal to the depth of entrenchment of said pipe;

(c) placing within said excavated area a conduit coupled at a first end thereof to said upwardly extending cut end of said entrenched pipe which is between said ground level and the depth of said entrenched pipe said conduit directed downwardly, and its opposite end reaching to about the depth of said entrenched pipe; and (d) coupling upon the lower end of said conduit, a sprinkler.

2. The method as recited in claim 1, in which said cutting step comprising cutting said free end at a point approximately midway between ground level and the depth of the entrenched pipe.

* * * * *